United States Patent [19]

Iwatsuki

[11] Patent Number: 4,685,356
[45] Date of Patent: Aug. 11, 1987

[54] CONTROL SYSTEM AND METHOD FOR AN AUTOMATIC TRANSMISSION PROVIDING SMOOTH ENGAGEMENT ACTION

[75] Inventor: Kunihiro Iwatsuki, Toyota, Japan

[73] Assignee: Toyota Jidosha Kabushiki Kaisha, Toyota, Japan

[21] Appl. No.: 797,867

[22] Filed: Nov. 14, 1985

[30] Foreign Application Priority Data

Apr. 18, 1985 [JP] Japan .................. 60-083390

[51] Int. Cl.⁴ .................................. B60K 41/04
[52] U.S. Cl. ........................ 74/866; 74/867; 74/752 A
[58] Field of Search .................. 74/868, 869, 853, 856, 74/858, 863, 866, 867, 740, 752 A, 752 C, 752 D; 364/424.1

[56] References Cited

U.S. PATENT DOCUMENTS

| 2,923,175 | 2/1960 | Perkins | 74/752 C |
|---|---|---|---|
| 4,262,335 | 4/1981 | Ahlen et al. | 74/752 D X |
| 4,312,248 | 1/1982 | Sugimoto et al. | 74/866 X |
| 4,324,156 | 4/1982 | Iwanaga et al. | 74/867 X |
| 4,393,467 | 7/1983 | Miki et al. | 74/866 X |
| 4,488,456 | 12/1984 | Taga et al. | 74/866 |
| 4,506,752 | 3/1985 | Hara et al. | 74/866 X |
| 4,523,281 | 6/1985 | Noda et al. | 74/866 X |

FOREIGN PATENT DOCUMENTS

| 32-127014 | 7/1957 | Japan . |
|---|---|---|
| 32-213787 | 12/1957 | Japan . |
| 47-39861 | 12/1972 | Japan . |
| 55-107260 | 8/1980 | Japan . |
| 55-119250 | 9/1980 | Japan . |
| 56-114061 | 7/1981 | Japan . |
| 55-26596 | 9/1981 | Japan . |
| 57-107088 | 6/1982 | Japan . |
| 58-104816 | 6/1983 | Japan . |
| 59-17299 | 8/1984 | Japan . |

*Primary Examiner*—Leslie Braun
*Assistant Examiner*—David Novais
*Attorney, Agent, or Firm*—Oblon, Fisher, Spivak, McClelland & Maier

[57] ABSTRACT

A control system for an automatic transmission system for a vehicle is adapted to control a partial clutch condition of one of two friction engaging devices which are oppositely engaged and disengaged in shifting the transmission from one speed stage to another speed stage, the control being such as to engage or disengage the one friction engaging device gradually by repetitive incremental increase or decrease of actuating fluid pressure supplied to the one friction engaging device while repetitively watching the rotational speed of a rotational element in the transmission during small time intervals. The gradual increase or decrease of the actuating fluid pressure in the one friction engaging device proceeds consistently as long as the rotational speed of the rotational element changes consistently but is temporarily reversed when the change of the rotational speed of the rotational element has deviated from its consistent trend of change as reflecting by the incremental increase or decrease of the actuating fluid pressure getting too high to maintain a smooth shifting between the speed stages.

8 Claims, 8 Drawing Figures

FIG. 3 (PART 1)

FIG. 3 (PART 2)

FIG. 4

FIG. 6 (PART 1)

FIG. 6 (PART 2)

CONTROL SYSTEM AND METHOD FOR AN AUTOMATIC TRANSMISSION PROVIDING SMOOTH ENGAGEMENT ACTION

The present invention relates to a control system and method for an automatic transmission, and more particularly relates to such a control system and method for an automatic transmission which provide good protection against transmission shifting shock.

A typical automatic transmission for a vehicle comprises a gear transmission mechanism which can selectively provide any one of a plurality of forward speed stages (gearing ratios) between its power input shaft connected to the crankshaft of the vehicle engine (typically via a torque converter) and its power output shaft connected to the driven road wheels of the vehicle, so as to transmit rotational power therebetween. And such a gear transmission mechanism, which typically comprises a plurality of selectively engagable gear trains, is set in a determinate way to one or the other of said plurality of forward speed stages, according to the current values of various operational parameters of the internal combustion engine and of the vehicle incorporating it, by engagement and disengagement of various friction engaging devices incorporated in said transmission in appropriate combinations. Such friction engaging devices typically include hydraulically actuated clutches and brakes. And the manner in which said plurality of forward speed stages is thus selected between according to the current values of said vehicle operational parameters is conventionally described by one or more shift diagrams.

Careful control of the timing and operation for engagement and disengagement of such friction engaging devices is particularly required in order to eliminate transmission shifting shock. Reference should be made in this connection to Japanese Patent Laying Open Publications Ser. Nos. 60-8373 (1985), 58-30555 (1983), 58-225226 (1983), 59-17049 (1984), 59-106751 (1984), and 59-23124 (1984), none of which it is intended hereby to admit as prior art to the present patent application except to the extent otherwise required by law.

Now, the assignee of the present patent application, who is also the applicant of the Japanese patent application of which the priority is being claimed for the present patent application, has proposed - in Japanese Patent Application Ser. Nos. 46-22604 (1971) which has been published as Japanese Patent Laying Open Publication Ser. No. 47-39861 (1972), and in Japanese Patent Application Ser. No. 59-176299 (1984), as well as in copending U.S. patent application Ser. No. 764,175 and Ser. No. 769,324, now U.S. Pat. No. 4,648,289, none of which it is intended hereby to admit as prior art to the present patent application except to the extent otherwise required by law - a form of automatic transmission including two gear transmission mechanisms fitted in series with one another, which is capable of providing either five or six forward speed stages. This type of automatic tranmission provides a special problem with regard to timing of engagement and disengagement of the friction engaging mechanisms of the two gear transmission mechanisms, because for the transitions between speed stages sometimes both the gear transmission mechanisms are required to be shifted at once. If the operation of the friction engaging devices involved in these shifts is not carefully coordinated, a troublesome shifting shock can be generated in the power train, which not only reduces the comfort of vehicle operation and reduces the drivability of the vehicle, but also can significantly shorten transmission life and durability and reliability of the vehicle power train as a whole.

SUMMARY OF THE INVENTION

Accordingly, it is the primary object of the present invention to provide a control system for an automatic transmission, particularly such as one with two such gear transmission mechanisms fitted in series with one another, which can satisfactorily perform shifting.

It is a further object of the present invention to provide such a control system for an automatic transmission, which can carefully coordinate the shifting of two such gear transmission mechanisms.

It is a further object of the present invention to provide such a control system for an automatic transmission, which can avoid shift shock.

It is a further object of the present invention to provide such a control system for an automatic transmission, which has good durability.

It is a further object of the present invention to provide such a control system for an automatic transmission, which provides good vehicle operational comfort.

It is a further object of the present invention to provide such a control system for an automatic transmission, which provides good vehicle drivability.

It is a further object of the present invention to provide such a control system for an automatic transmission, which provides good power train reliability.

It is a further object of the present invention to provide a method of control of such an automatic transmission, which aids in the achievement of the above identified objects.

According to the present invention, these and other objects are accomplished by a control system for an automtaic transmission system for a vehicle, said automatic transmission system comprising a gear transmission mechanism which comprises a rotating element and a friction engaging mechanism according to engagement and disengagement of which the speed stage provided by said gear transmission mechanism changes over, comprising: a means for detecting the rotational speed of said rotating element; and: a means for, during speed stage change over, according to said detected rotational speed of said rotating element, controlling by a form of feedback control the engagement conditions of said friction engaging mechanism, so that said detected rotational speed does not change by more than a certain determinate amount; and by a control method for an automatic transmission system for a vehicle, said automatic transmission system comprising a gear transmission mechanism which comprises a rotating element and a friction engaging mechanism according to engagement and disengagement of which the speed stage provided by said gear transmission mechanism changes over, comprising the steps of: detecting the rotational speed of said rotating element; and: during speed stage change over, according to said detected rotational speed of said rotating element, controlling by a form of feedback control the engagement conditions of said friction engaging mechanism, so that said detected rotational speed does not change by more than a certain determinate amount.

According to such a structure and such a method, the engagement and release of the firction engaging mechanism are controlled by time or feedback control so as not to change when the input rotational speed is above a certain value, i.e. so that said rotational speed is kept largely constant. Thus, engine racing during speed changing is avoided, and also temporary drops in input rotational speed are avoided, giving smooth speed stage changing without shifting shock.

Further, this invention is particularly applicable in the case that said gear transmission mechanism comprises a first gear transmission submechanism and a second gear transmission submechanism connected together in series, said friction engaging mechanism being comprised in said first gear transmission submechanism, and said change over of speed stage involving changing over of the individual speed stage of both said first gear transmission submechanism and said second gear transmission submechanism together. In this case, said rotating element may be the power input shaft of said first gear transmission submechanism, or may be one rotationally coupled to a sun gear of said second gear transmission submechanism.

BRIEF DESCRIPTION OF THE DRAWINGS

The present invention will now be described with respect to several preferred embodiments of the method and the apparatus aspects thereof, and with reference to the illustrative drawings appended hereto. It should be clearly understood, however, that the description of the embodiments, and the drawings, are provided for the purposes of explanation and exemplification only, and are not intended to be limitative of the scope of the present invention in any way, since this scope is to be delimited solely by the accompanying claims. In the figures, spatial terms are to be understood as referring only to the orientation on the drawing paper of the illustrations of the relevant parts, unless otherwise specified; like reference numerals, unless otherwise so specified, denote the same parts and gaps and spaces and so on in the collection of figures relating to one embodiment, and denote like parts and gaps and spaces and so on in figures relating to different embodiments; and:

DESCRIPTION OF THE PREFERRED EMBODIMENTS

Figure 1:
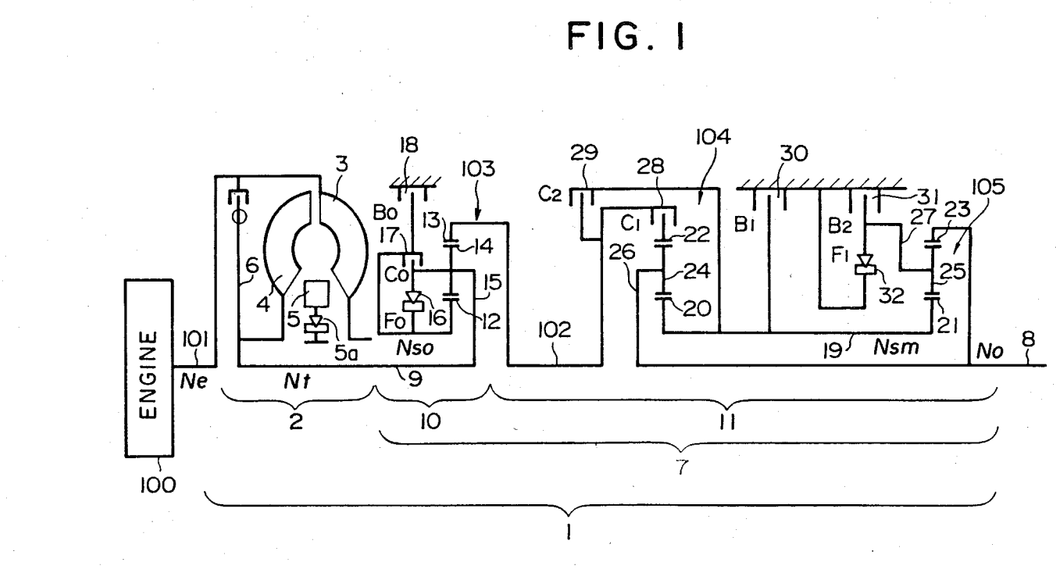
FIG. 1 is a schematic skeleton diagram showing the overall layout of the components of an automatic transmission to which both of the preferred embodiments of the control system and method of the present invention are applied.

The present invention will now be described with reference to the preferred embodiments thereof, and with reference to the figures. FIG. 1 is a schematic skeleton diagram showing the overall layout of the components of an automatic transmission, denoted by the reference numeral 1, to which either of the preferred embodiments of the control system of the present invention can be applied. In this figure, the automatic transmission 1 is shown as being powered by an internal combustion engine 100 via a shaft 101 which rotates at a rotational speed denoted by Ne, and as transmitting output rotational power to a shaft 8 which leads, although this is not particularly indicated in the figures, to a differential device for powering the driven wheels of the automotive vehicle to which this automatic transmission 1 and this internal combustion engine 100 are fitted, said power output shaft 8 rotating at a rotational speed denoted by No.

In more detail, the automatic transmission 1 comprises a fluid torque converter assembly 2 and a gear transmission mechanism 7. The fluid torque converter assembly 2 is supplied with rotational power via the aforementioned power output shaft 101 of the internal combustion engine 100, which thus functions as a power input shaft for said fluid torque converter assembly 2; and a shaft 9 functions as a power output shaft for said fluid torque converter assembly 2 and also as a power input shaft for the gear transmission mechanism 7 and transmits rotational power therebetween, said shaft 9 rotating at a rotational speed denoted by Nt.

The fluid torque converter assembly 2 is of a per se conventional three element single stage type with a direct clutch, and comprises a pump impeller 3 rotationally connected to the power output shaft 101 of the internal combustion engine 1, a turbine member 4 rotationally connected to the power output shaft 9 for said torque converter assembly 2, and a stator member 5 mounted via a one way clutch 5a to the casing of said fluid torque converter assembly 2. In a per se known fashion, by circulation of transmission fluid in the general circulation pattern of a smoke ring around the toroidal shape defined by the pump impeller 3, the turbine member 4, and the stator member 5, torque is transmitted from the pump impeller 3 to the turbine member 4 and thereby from the power input shaft 101 of the fluid torque converter assembly 2 to the power output shaft 9 thereof, with a certain amount of slippage and also of torque amplification being provided therebetween, the amount of such slippage and torque amplification being determined by the rotational speed of the power input shaft 101 of the torque converter assembly 2 and also by the output load on its power output shaft 9. The amount of this slippage can be ascertained by comparison of the input and output rotational speeds Ne and Nt of the torque converter 2. A lock up clutch 6 of a per se known sort is provided for, when optionally engaged by the supply of actuating hydraulic pressure thereto, directly connecting the power input shaft 101 to the power output shaft 9, thus bypassing the above described hydraulic connection for the torque converter assembly and eliminating said slippage and torque amplification provided thereby.

In further detail, the gear transmission mechanism 7 comprises an auxiliary gear transmission 10 and a main gear transmission mechanism 11. The auxiliary gear transmission mechanism 10 is supplied with rotational power via the aforementioned power output shaft 9 of the fluid torque converter mechanism 2, which thus functions as a power input shaft for said auxiliary gear transmission mechanism 10; and a shaft 102 functions as a power output shaft for said auxiliary gear transmission mechanism 10 and also as a power input shaft for the main gear transmission mechanism 11 and transmits rotational power therebetween.

First, the auxiliary gear transmission mechanism 10 will be explained. This mechanism 10 comprises a first planetary gear mechanism 103 which comprises a sun gear 12, a coaxially provided ring gear 13, and a carrier 15 which rotatably supports a plurality of planetary pinions 14 which are meshed with outer teeth formed on the sun gear 12 and with inner teeth formed on the ring gear 13 and which perform planetary motion between said sun gear 12 and said ring gear 13 in a per se conventional manner. The carrier 15 of the planetary pinions 14 is rotationally connected to the power input shaft 9 of the auxiliary gear transmission mechanism 10 to receive rotational power therefrom, and the ring gear 13 is rotationally connected to the power output shaft 102 thereof so as to transmit rotational power thereto. A one way clutch F0 16 is provided for always rotationally connecting the carrier 15 to the sun gear 12 with respect to mutual rotation therebetween in one rotational direction only; a clutch C0 17 is provided for selectively, when operated by selective supply of actuating hydraulic fluid pressure thereto, rotationally connecting the carrier 15 to the sun gear 12 with respect to mutual rotation therebetween in both rotational directions; and a brake B0 18 is provided for selectively, when operated by selective supply of actuating hydraulic fluid pressure thereto, rotationally connecting the sun gear 12 to the casing of the auxiliary gear transmission mechanism 10 with respect to mutual rotation therebetween in both rotational directions. The clutch C0 and the brake B0 are per se conventional types of friction engaging mechanism comprising per se conventional hydraulic actuator systems, and are engaged when hydraulic fluid pressure is supplied to their pressure chambers (not particularly shown), while they are disengaged when no hydraulic fluid pressure is supplied to their said pressure chambers. Thus, by selective engagement and disengagement of the clutch C0 and the brake B0, the auxiliary gear transmission mechanism 10 can be controlled to provide either of two gearing ratios or rotational speed stages (i.e., a direct speed stage and an overdrive speed stage) between its power input shaft 9 and its power output shaft 102, in a manner which will be clear to one of ordinary skill in the relevant art based upon the above explanations. The rotational speed of the sun gear 12, in what follows, will be denoted by the reference symbol Nso.

Next, the main gear transmission mechanism 11 will be explained. This mechanism 11 comprises second and third planetary gear mechanisms 104 and 105 which are arranged on the outside of a hollow intermediate shaft 19 which is coaxially fitted over the aforementioned power output shaft 8 of this main gear transmission mechanism 11. The second planetary gear mechanism 104 comprises a sun gear 20, a coaxially provided ring gear 22, and a carrier 26 which rotatably supports a plurality of planetary pinions 24 which are meshed with outer teeth formed on the sun gear 20 and with inner teeth formed on the ring gear 22 and perform planetary motion between said sun gear 20 and said ring gear 22 in a per se conventional manner. The sun gear 20 is fixed on the left end in the figure of the intermediate shaft 19, and the carrier 26 for the planetary pinions 24 is rotationally connected to the power output shaft 8 of this main gear transmission mechanism 11. A clutch C1 28 is provided for selectively, when operated as will be particularly described later by selective and appropriate supply of actuating hydraulic fluid pressure thereto, rotationally connecting the ring gear 22 to the power input shaft 102 of this main gear transmission mechanism 11 with respect to mutual rotation therebetween in both rotational directions. And a clutch C2 29 is provided for selectively, when operated by selective supply of actuating hydraulic fluid pressure thereto, rotationally connecting said power input shaft 102 of this main gear transmission mechanism 11 to the sun gear 20 and to the aforementoned intermediate shaft 19 with respect to mutual rotation therebetween in both rotational directions. The clutch C1, which functions as a forward clutch and is engaged when and only when the automatic transmission mechanism 1 as a whole is providing forward drive, is of a per se conventional type which is engaged when hydraulic fluid pressure is supplied to its actuating pressure chamber (not particularly shown), while it is disengaged when no hydraulic fluid pressure is supplied to its said pressure chamber. Further, the clutch C2, which functions as a direct clutch, is a per se conventional type of friction engaging mechanism comprising a per se conventional hydraulic actuator system, and like the clutches C0 and C1 is engaged when hydraulic fluid pressure is supplied to its pressure chamber (not particularly shown), while it is disengaged when no hydraulic fluid pressure is supplied to its said pressure chamber. The third planetary gear mechanism 105 comprises a sun gear 21, a coaxially provided ring gear 23, and a carrier 27 which rotatably supports a plurality of planetary pinions 25 which are meshed with outer teeth formed on the sun gear 21 and with inner teeth formed on the ring gear 23 and perform planetary motion between said sun gear 21 and said ring gear 23 in a per se conventional manner. The sun gear 21 is fixed on the right end in the figure of the aforementioned intermediate shaft 19, and the ring gear 23 is rotationally connected to the power output shaft 8 of this main gear transmission mechanism 11. A brake B1 30 is provided for selectively, when operated by selective supply of actuating hydraulic fluid pressure thereto, rotationally connecting the aforementioned intermediate shaft 19 to the casing of this main gear transmission mechanism 11 with respect to mutual rotation therebetween in both rotational directions. And a brake B2 31 is provided for selectively, when operated by selective supply of actuating hydraulic fluid pressure thereto, rotationally connecting the carrier 27 for the planetary pinions 25 to said casing of this main gear transmission mechanism 11 with respect to mutual rotation therebetween in both rotational directions. Also, a one way clutch F1 is provided for always rotationally connecting said carrier 27 for said planetary pinions 25 to said casing of this main gear transmission mechanism 11 with respect to mutual rotation therebetween in one rotational direction only. These brakes B1 and B2 again are pe se conventional types of friction engaging mechanisms comprising per se conventional hydraulic actuator systems, and like the brake B0 are engaged when hydraulic fluid pressure is supplied to their pressure chambers (not particularly shown), while they are disengaged when no hydraulic fluid pressure is supplied to their said pressure chambers. The rotational speed of the intermediate shaft 19 and the sun gears 20 and 21, in what follows, will be denoted by the reference symbol Nsm.

Thus, by selective engagement and disengagement of the clutches C1 and C2 and of the brakes B1 and B2, the main gear transmission mechanism 11 can be controlled to provide any one of three forward gearing ratios or rotational speed stages and one reverse gearing ratio or rotational speed stage between its power input shaft 102 and its power output shaft 8, in a manner which will be clear to one of ordinary skill in the relevant art based upon the above explanations. And, further, the gear transmission mechanism 7 as a whole, as a combination of the auxiliary gear transmission mechanism 10 and the main gear transmission mechanism 11 and by the combined operation thereof, according to selective engagement and disengagement of the clutches C0, C1, and C2 and of the brakes B0, B1, and B2, can be controlled to provide any one of five forward gearing ratios or rotational speed stages including an overdrive speed stage and one reverse gearing ratio or rotational speed stage between its power input shaft 9 and its power output shaft 8, as particularly detailed in the Table, which is for typographical convenience given at the end of the specification and before the Claims of the present patent application. In this Table, an "O" in a column relating to a hydraulic clutch or a hydraulic brake indicates that said hydraulic clutch or hydraulic brake is engaged, while an "X" relating to such a hydraulic clutch or a hydraulic brake indicates that said hydraulic clutch or hydraulic brake is disengaged; and an "O" in a column relating to a one way clutch indicates that said one way clutch is engaged so as to transmit rotational power when the internal combustion engine 100 is powering the driven wheels of the vehicle via the automatic transmission system 1 and on the other hand is free wheeling or disengaged when said engine is not so driving said driven wheels of the vehicle, in other words indicates that said one way clutch is free wheeling in, and only in, the engine overrun condition; while an "F" relating to a one way clutch indicates that said one way clutch is free wheeling or disengaged. From this Table, it will be understood that, when the automatic transmission 1 is being operated in the drive or "D" range, all five of its forward speed stages including its overdrive speed stage are available to be utilized, according to vehicle operational conditions as will be explained later; but, however, when the automatic transmission 1 is being operated in the second or "S" range, no upshift from the third speed stage to the fourth or the fifth speed stage is ever performed, and only the first through the third speed states are available to be utilized, and furthermore, when the automatic transmission 1 is being operated in the low or "L" range, no upshift from the second speed stage to the third, the fourth, or the fifth speed stage is ever performed, and only the first and the second speed stages are available to be utilized. And further it will be particularly noted from this Table that the hydraulic clutch C1 is engaged when, and only when, the gear transmission mechanism 7 is engaged to a forward speed stage (i.e., to the first, second, third, fourth, or fifth speed stage), and is otherwise disengaged; accordingly, said clutch 28 will henceforward be termed a forward clutch. And the clutch 29 is engaged when and only when the main gear transmission mechanism 11 is providing its highest or directly connected speed stage, i.e. in case of engagement of the fourth or the fifth speed stage of the gear transmission mechanism 7 as a whole, and accordingly in the following this clutch 29 will be termed a direct clutch.

In detail, the auxiliary gear transmission mechanism 10 provides a directly coupled speed stage when the brake B0 is released, the clutch C0 is engaged, and thus the sun gear 12 and the carrier 15 are mutually rotationally connected, while on the other hand it provides a speed increasing or overdrive speed stage when the brake B0 is engaged, the clutch C0 is released, and thus the sun gear 12 is rotationally fixed with respect to the casing of said auxiliary gear transmission mechanism 10. As will be clear from the Table, when the forward clutch 28 and the direct clutch 29 are both engaged and the main gear transmission mechanism 11 is set to its highest or directly connected speed stage, and also when the forward clutch 28 is engaged and the main gear transmission mechanism 11 is set to it lowest or first speed stage, the auxiliary gear transmission mechanism 10 switches to and fro betweeen its directly coupled speed stage and its overdrive speed stage according of course to vehicle operational conditions, thus providing two speed stages in each case for the gear transmission mechanism 7 as a whole, while on the other hand when said main gear transmission mechanism 11 is set to its intermediate or second speed stage the auxiliary gear transmission mechanism 10 remains fixed in its directly coupled speed stage, thus only providing one speed stage in this case for the gear transmission mechansim 7 as a whole. Thus, as contrasted to a conventional transmission in which only four forward speed stages including an overdrive speed stage are provided, now in the operation of this gear transmission mechanism 7 the overdrive speed stage constitutes the fifth speed stage thereof, and another speed stage is newly provided between the first or lowest overall speed stage provided by the lowest speed stage of the main gear transmission mechanism 11 and by the directly connected speed stage of the auxiliary gear transmission mechanism 10, and the overall speed stage provided by the next speed stage up of said main gear transmission mechanism 11 (which conventionally was the second overall speed stage of the transmission as a whole, but now becomes the third), and this new overall speed stage becomes the second speed stage of the transmission as a whole; whereby altogether the gear transmission mechanism 7 now is caused to provide a total of five speed stages.

In general, each of the various hydraulic clutches and brakes detailed above, i.e. the clutches C0, C1, and C2 and the brakes B0, B1, and B2, as well as the lock up clutch 6 incorporated in the torque converter 2, is selectively engaged and disengaged by its hydraulic actuator system, by selective supply of hydraulic fluid pressure thereto from a control system which is an embodiment of the control system of the present invention, according to the current values of various operational parameters of the vehicle to which this automatic transmission 1 is fitted, such as vehicle road speed, engine load, range set by the vehicle driver on a manual range setting valve, and so on. The various embodiments of the control system of the present invention are all of the hybrid hydraulic/electronic type incorporating a microprocessor, and in FIG. 2 a schematic block diagram of relevant parts of said preferred embodiments of said control system is shown; this figure is generic to both of the preferred embodiments of the present invention which will be discussed.

Figure 2:
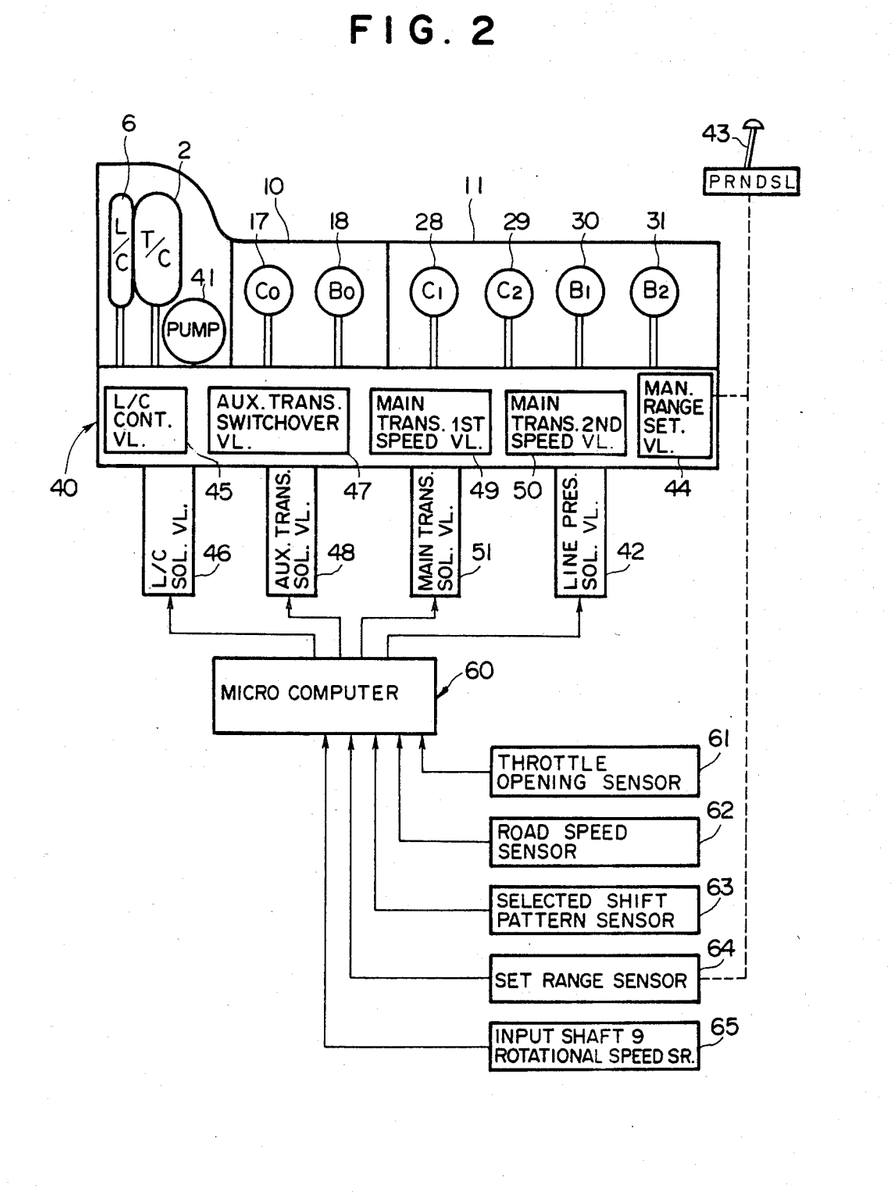
FIG. 2 is a schematic block diagram showing relevant parts of said first and second preferred embodiments of the control system of the present invention, as applied to the FIG. 1 transmission.

A hydraulic fluid pump 41, rotationally driven by the engine 100 via the torque converter 2, picks up hydraulic fluid from a sump (not shown) and supplies it under pressure to a line pressure regulation valve, not particularly shown, which is regulated by a line pressure solenoid valve 42. The line pressure regulation valve selectively bleeds off some of said pressurized hydraulic fluid back to the sump so as to produce a line pressure by duty factor control based upon the operational state of the engine 1 at its output side, said line pressure being regulated to a substantially constant value which is determined by the line pressure solenoid valve 42. This line pressure is supplied to various elements, including a manual range setting valve 44, which is per se conventional, comprising a valve element (not particularly shown) which is manually settable by the driver of the vehicle, via a linkage or the like which leads from a manually controllable lever 43, to any one of the aforementioned various speed ranges, i.e. "D" or drive range, "S" or second range, "L" or low range, "R" or reverse range, "N" or neutral range, and "P" or parking range. The line pressure is also supplied to appropriate ports of a lock up clutch control valve 45, a lock up clutch solenoid valve 46, an auxiliary transmission switchover valve 47, an auxiliary transmission solenoid valve 48, a main transmission first speed switchover valve 49, a main transmission second speed switchover valve 50, and a main transmission solenoid valve 51.

The lock up clutch control valve 45 is structured as a spool valve comprising a valve element (not particularly shown) which is switched to and fro according to whether or not hydraulic fluid pressure is supplied to a control port (not shown either) of said control valve 45; and, according to the switched position of its said valve element, said lock up clutch control valve 45 either supplies appropriate actuating fluid pressure to the lock up clutch 6 so as to engage it, or does not supply said appropriate actuating fluid pressure so that said lock up clutch 6 is not engaged. And said supply of hydraulic fluid pressure to said control port of said lock up clutch control valve 45 is selectively performed by the lock up clutch solenoid valve 46, according to whether or not said lock up clutch solenoid valve 46 receives an actuating electrical signal from an electrical control device which will be explained in detail hereinafter. Thus, via the lock up clutch control valve 45 which functions as an intermediary, the lock up clutch solenoid valve 46 controls the engagement or disengagement of the lock up clutch 6, under the control of the electrical control device.

Similarly, the auxiliary transmission switchover valve 47 is structured as a spool valve comprising a valve element (not particularly shown) which is switched to and fro according to whether or not hydraulic fluid pressure is supplied to a control port (not shown either) of said switchover valve 47; and, according to the switched position of its said valve element, said auxiliary transmission switchover valve 47 either: supplies appropriate actuating fluid pressure to the clutch C0 of the auxiliary gear transmission mechanism 10 so as to engage it and does not supply any actuating fluid pressure to the brake B0 of said auxiliary gear transmission mechanism 10 so as not to engage it, whereby said auxiliary gear transmission mechanism 10 is engaged to its directly connected speed stage; or alternatively does not supply any such actuating fluid pressure to said clutch C0 so as not to engage it while supplying actuating fluid pressure to said brake B0 so as to engage it, whereby said auxiliary gear transmission mechanism 10 is engaged to its speed increasing speed stage or the overdrive speed stage. And, similarly to the previous case, said supply of hydraulic fluid pressure to said control port of said auxiliary transmission switchover valve 47 is selectively performed by the auxiliary transmission solenoid valve 48, according to whether or not said auxiliary transmission solenoid valve 48 receives an actuating electrical signal from said electrical control device. Thus, via the auxiliary transmission switchover valve 47 which functions as an intermediary, the auxiliary transmission solenoid valve 48 controls the engagement or disengagement of the auxiliary gear transmission mechanism 10, under the control of the electrical control device.

And, further, the main transmission first speed switchover valve 49 and the main transmission second speed switchover valve 50 are also both structured as spool valves comprising valve elements (not particularly shown). The spool element of the main transmission first speed switchover valve 49 is switched to and fro according to whether or not hydraulic fluid pressure greater than a first determinate pressure valve is supplied to a control port (not particularly shown) of said valve 49; and, similarly, the spool element of the main transmission second speed switchover valve 50 is switched to and fro according to whether or not hydraulic fluid pressure greater than a second determinate pressure value, higher than said first determinate pressure value, is supplied to a control port of said valve 50. And, according to the switched position of their said valve elements, said main transmission first speed switchover valve 49 and said main transmission second speed switchover valve 50, taken as a combination, supply and do not supply the various appropriate actuating fluid pressures to the the forward clutch C1, the direct clutch C2, and the brakes B1 and B2 of the main gear transmission mechanism 11 to engage and disengage appropriate combinations thereof, as shown in the Table, so as to set said main gear transmission mechanism 11 to one or the other of its three forward speed stages, according as to whether (a) pressure less than said first determinate value is supplied to the control port of the valve 49 and also pressure less than said second determinate pressure valve is supplied to the control port of the valve 50; or (b) pressure greater than said first determinate value is supplied to the control port of the valve 49 while pressure less than said second determinate pressure value is supplied to the control port of the valve 50; or (c) pressure greater than said first determinate value is supplied to the control port of the valve 49 and also pressure greater than said second determinate pressure value is supplied to the control port of the valve 50. And, rather in contrast to the previous cases, said supply of hydraulic fluid pressure to both said control port of said main transmission first speed switchover valve 49 and also said control port of said main transmission second speed switchover valve 50 is selectively performed by the main transmission solenoid valve 51, in the following way: According to whether or not said main transmission solenoid valve 51 receives an actuating electrical signal from said electrical control device, it communicates line pressure which it receives at its input port to its output port, or drains said output port. The electrical control device supplies a pulse signal of a certain controlled duty factor to said main transmission solenoid valve 51, and by alteration of this duty factor is able to control the output pressure of said valve 51 to be either less than said first (and a fortiori less than said second) determinate pressure valve, intermediate between said first and said determinate second pressure values, or greater than said second (and a fortiori greater than said first) determinate pressure value. Thus, via the main transmission first speed switchover valve 49 and the main transmission second speed switchover valve 50 which function as intermediaries, the main transmission solenoid valve 51 controls the engagement or disengagement of the main gear transmission mechanism 11, under the control of the electrical control device. If further detail is required relating to this type of control of the clutches and brakes of the main gear transmission mechanism 11 by two speed switchover valves and one solenoid valve which operates according to a method of duty ratio control, reference should be made to Japanese Utility Model Application Ser. No. Sho. 55-26596 (1980), which has been published as Japanese Utility Model Laying Open Publication Ser. No. 58-38186 (1983), and to Japanese Patent Application Ser. No. Sho. 55-107260 (1980), which has been published as Japanese Patent Laying Open Publication Ser. No. 56-26246 (1981), neither of which is it intended hereby to admit as prior art to the present patent application except to the extent otherwise mandated by law.

The lock up clutch solenoid valve 46, auxiliary transmission solenoid valve 48, and the main transmission solenoid valve 51 are selectively supplied with actuating electrical energy from an electrical control device which in this preferred embodiment of the present invention incorporates a microcomputer 60. This microcomputer 60 in fact is in overall control of the automatic transmission, and controls the engagement and disengagement of all of the hydraulic clutches and brakes detailed above. The microcomputer 60 receives input signals from sensors including: a throttle opening sensor 61, which senses the position of the throttle pedal (not particularly shown) of the internal combustion engine 100 of the vehicle and which produces an output signal representative thereof, which is taken as representative of engine level; a road speed sensor 62, which produces an output signal representative of vehicle road speed; a selected shift pattern sensor 63, which again is manually controlled by the driver of the vehicle, and which he or she sets to one or another position according as he or she desires to employ one or another shifting mode for the transmission; a set range sensor 64, which is provided as appended to the manual lever 43 connected to the range selection valve 44, and which produces an output signal representative of what speed range is currently set on said manual range selection valve 44; and an input member rotational speed sensor 65, which senses the rotational speed of the turbine member 4 of the torque converter 2, i.e. the rotational speed Nt of the power input shaft 9 of the overall gear transmission mechanism 7, and which produces an output signal representative thereof. And the microcomputer 60 repeatedly executes a control program for setting the various clutches and brakes detailed above to be engaged or disengaged, by appropriate supply or non supply of ON/OFF electrical control signals to the lock up clutch solenoid valve 46 and to the auxiliary transmission solenoid valve 48, and by supply of an electrical pulse signal of the appropriate duty ratio of the main transmission solenoid valve 51, as explained above. One relevant portion of said control program will now be detailed, with reference to FIG. 3 which is a flow chart of said relevant portion and with reference to the speed change control characteristic charts given in FIGS. 4 and 5 which result therefrom. This portion of the program is performed at regular intervals, or once every time the crankshaft of the engine 100 rotates through a determinate angle.

Figure 3:
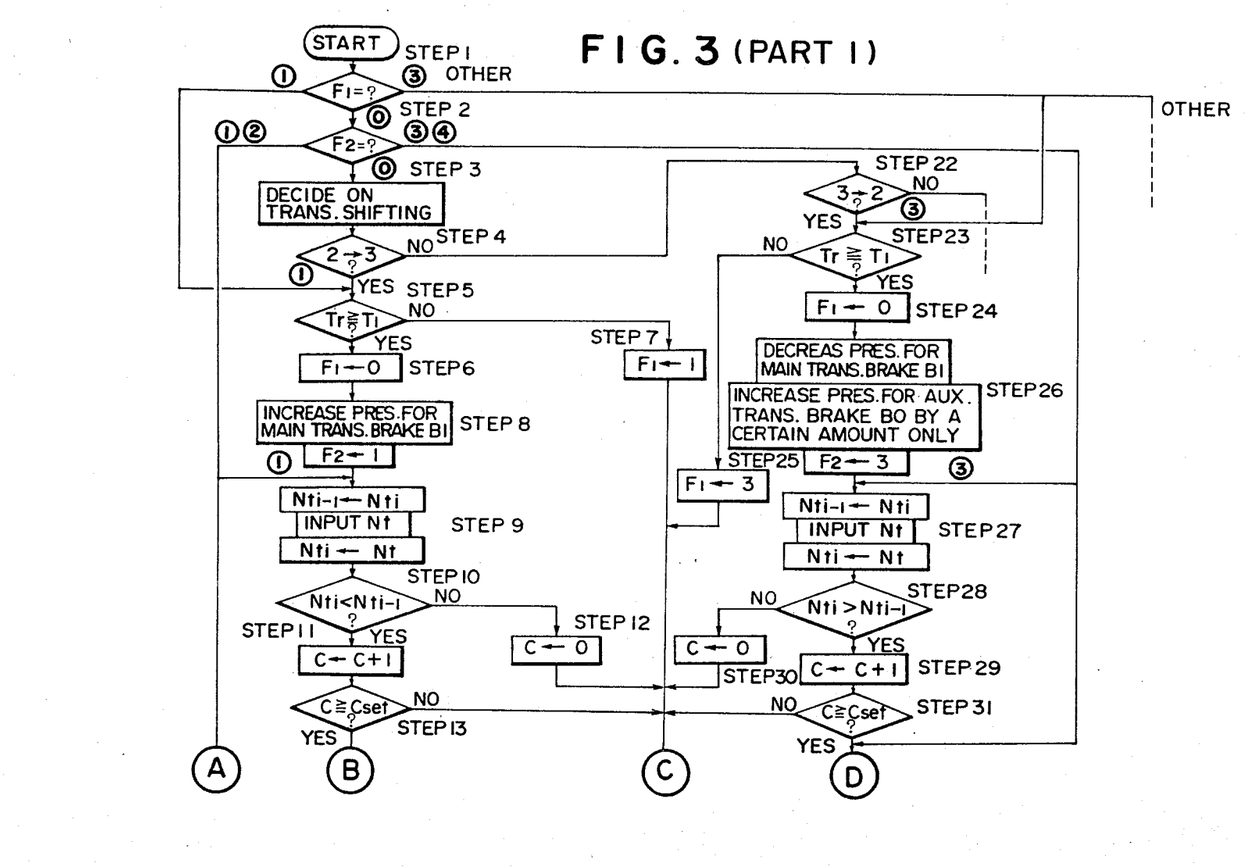
FIG. 3 is a flow chart for a portion of a program executed by a microprocessor incorporated in said first preferred embodiment of the system of the present invention, said portion relating to the first preferred embodiment of the method of the present invention.

First, in the decision step 1, a test is made of the value of a flag F1. If the value of the flag F1 is 0, then next the flow of control passes to the decision step 2; if the value of the flag F1 is 1, then next the flow of control passes to the decision step 5; if the value of the flag F1 is 3, then next the flow of control passes to the decision step 23; and otherwise the flow of control passes as indicated by the dashed line to a program portion not detailed herein because it is not directly relevant to the present invention.

Next, in the decision step 2, a test is made of the value of a flag F2. If the value of the flag F2 is 0, then next the flow of control passes to the step 9; if the value of the flag F2 is 1, then next the flow of control passes to the decision step 5; if the value of the flag F2 is 2, then next the flow of control passes to the step 15; if the value of the flag F2 is 3, then next the flow of control passes to the step 27; and the only other possibility for the value of the flag F2 is to be 4, in which case next the flow of control passes to the step 32.

Next, in the step 3, calculations and the like are performed, to decide whether or not it is now a proper time to perform a shift of transmission speed stage; the details are not particularly given herein, because they are not directly relevant to the present invention. The time point in the FIG. 4 operational characteristic chart corresponding to this shift decision point is shown by the first vertical line.

Next, in the decision step 4, a decision is made as to whether or not, at this time, an upshift from the second speed stage to the third speed stage of the overall gear transmission mechanism 7 is currently required, based upon the results of the calculations and the like made in the step 3. If the answer to this decision is YES, then next the flow of control passes to the decision step 5; and otherwise, if the answer to this decision is NO, the flow of control passes to the decision step 22.

In the decision step 5, to which the flow of control comes if definitely an upshift from the second speed stage to the third speed stage of the overall gear transmission mechanism 7 is currently required, a decision is made as to whether or not the elapsed time Tr (determined by a timer or the like) since first the decision for this upshift was made has become greater than or equal to a determinate time interval T1, or not. If the answer is NO, then this upshift delay time interval T1 has not yet been concluded, and accordingly the flow of control passes next to the step 7, in which the value of the flag F1 is set to 1, so as to bypass the steps 2, 3, and 4 on the next iteration through the FIG. 3 routine; and then the flow of control passes to the end of said FIG. 3 routine, to cycle again back to this decision step 5 in a tight loop, until in fact the elapsed time Tr does become equal to the determinate time interval T1. On the other hand, if the answer to the step 5 decision is YES, so that enough time has elapsed since the upshift decision, then next the flow of control passes to the step 6.

Figure 4:
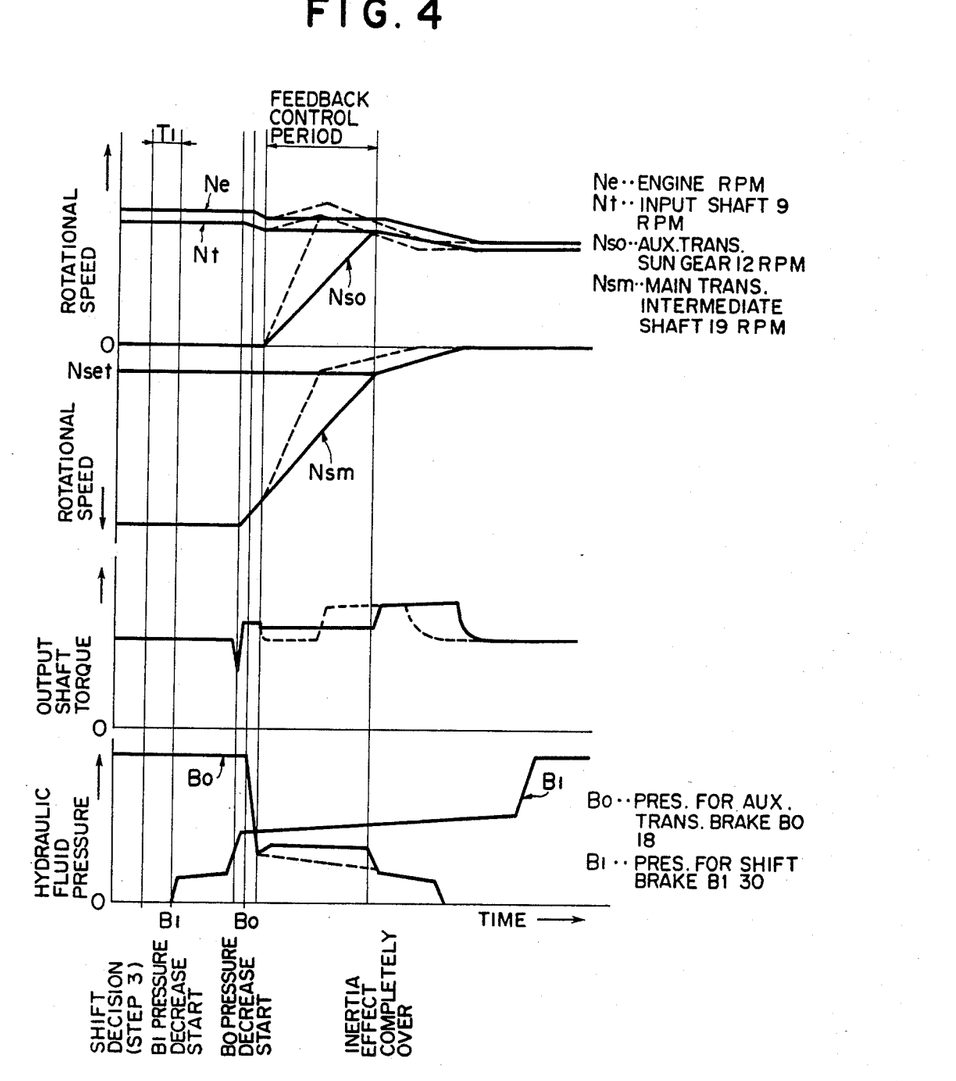
FIG. 4 is a set of time charts relating to an upshift of the FIG. 1 transmission under the control of the FIG. 3 program fragment, showing upshifting operational characteristics.

In the step 6, the value of the flag F1 is set back to zero again, and the flow of control passes to the step 8. In this step 8, action is taken to start increasing the actuating pressure to the brake B1 of the main gear transmission mechanism 11, and also the value of the flag F2 is set to be equal to 1, so as to bypass the steps 3, 4, 5, 6, and 8 on the next iteration through the FIG. 3 routine; and then the flow of control passes to the step 9. The time point in the FIG. 4 operational characteristic chart corresponding to this action point for starting the increase of the actuating pressure for the brake B1 is shown by the second vertical line. And, as shown in FIG. 4 after said second vertical line, henceforward the actuating pressure of the brake B1 increases, at first relatively suddenly due to the initial pressure rush, and thereafter more slowly for a certain time period, after which it increases more rapidly again when the slack in said brake B1 has been taken up. Meanwhile, at this time, the rotational speeds of the various relevant transmission members do not substantially alter.

In the next step 9. the value $Nt_i$ of Nt, the rotational speed of the input shaft 9 of the overall gear transmission mechanism 7 as sensed by the rotational speed sensor 65 therefor, acquired on the last time through this routine, is assigned to the storage location $Nt_{i-1}$, and then the current value of Nt is inputted from the sensor 65 and is assigned to the storage location $Nt_i$. Thus, after this step 9, the previous value of Nt is contained in the location $Nt_{i-1}$, and the current value of Nt is contained in the location $Nt_i$.

Next, in the decision step 10, a test is made as to whether or not $Nt_i$ is less than $Nt_{i-1}$, or not, in other words, as to whether the rotational speed Nt of the transmission input shaft 9 is dropping, or not. If the answer is NO, then the value of count C is set to zero in the step 12, and the flow of control passes to exit from the FIG. 3 routine, without doing anything further, but if the answer is YES, so that now the rotational speed Nt of the transmission input shaft 9 is dropping, then the flow of control passes next to the step 11.

In the step 11, the value of the count C is incremented, and then control passes to the decision step 13. In this decision step 13, a decision is made as to whether the counted value in the count C has yet become greater than or equal to a determinate value Cset, or not. If the answer is NO, so that a certain determinate time has not yet passed, then the flow of control passes to exit from the FIG. 3 routine, without doing anything further, but if the answer is YES, so that the rotational speed of the input shaft 9 has been dropping for at least a determinate time period corresponding to this determinate count value Cset, then the flow of control passes next to the step 14.

In this step 14, the starting of draining of the pressure from the brake B0 18 of the auxiliary gear transmission mechanism 10 is performed, so that the downshift of said auxiliary gear transmission mechanism 10 from its speed increasing speed stage to its directly connected speed stage is commenced, and also the value of the flag F2 is set to be equal to 2, so as to bypass the relevant ones of the steps 3 through 14 on the next iteration through the FIG. 3 routine; and then next the flow of control passes to the step 15.

In this step 15, similarly to the step 9, the value of $Nt_i$ of Nt, the rotational speed of the input shaft 9 of the overall gear transmission mechanism 7 as sensed by the sensor 65, is assigned to the storage location $Nt_{i-1}$, and then the current value of Nt is inputted from the sensor 65 is assigned to the storage location $Nt_i$. Thus, after this step 15, again the previous value of Nt is contained in the location $Nt_{i-1}$, and the current value of Nt is contained in the location $Nt_1$.

Next, in the decision step 16, a test is made as to whether or not $Nt_i$ is greater than $Nt_{i-1}$, or not, in other words, as to whether the rotational speed Nt of the transmission input shaft 9 is now increasing, or not. If the answer is YES, then the flow of control passes next to the step 17a, but if the answer is NO, then the flow of control passes next to the step 17b.

In the step 17a, the actuating pressure being supplied to the brake B0 18 of the auxiliary gear transmission mechanism 10 is increased by an amount deltaP, so as to delay the release of the brake B0 18, so that the downshift of said auxiliary gear transmission mechanism 10 from its speed increasing speed stage to its directly connected speed stage is somewhat delayed. On the other hand, in the step 17b, the actuating pressure being supplied to said brake B0 18 is decreased by said amount deltaP, so as to speed up the release of the brake B0 18, so that said downshift of said auxiliary gear transmission mechanism 10 is somewhat sped up. In any case, next the flow of control passes to the step 18.

In the step 18, the rotational speed No of the power output shaft 8 of the overall gear transmission mechanism 7 as sensed by the road speed sensor 62 or as converted from the result of its output signal is inputted, and next the flow of control passes to the decision step 19.

Next, in this decision step 19, a test is made as to whether or not the current value $Nt_i$ of the rotational speed of the power input member 9 of the overall transmission 7 is smaller than or equal to this rotational speed No of the power output shaft 8 multiplied by the third speed stage ratio R3, or not, in other words, as to whether the so called inertia phase of the gear transmission mechanism 7 is still continuing, or not. If the answer is YES, then inertia phase is completed and the flow of control passes next to the step 20, but if the answer is NO, then the inertia phase has still continuing and next the flow of control passes to exit from the FIG. 3 routine, without doing anything further.

In the step 20, which is as specified above reached when the input rotational speed of the overall transmission 7 comes to be greater than or equal to the rotational speed No of the power output shaft 8 multiplied by the third speed stage ratio R3, so that definitely the inertia phase of the second speed to third speed upshift of the gear transmission mechanism 7 has ended, then the actuating pressure being supplied to said brake B0 18 is abruptly decreased to zero, so as to fully release the brake B0 18 as quickly as possible, so that said downshift of said auxiliary gear transmission mechanism 10 is finished as quickly as possible. And next the flow of control passes to the step 21, in which the values of the flags F1 and F2 are reset to zero along with the value of the count C, and the flow of control passes out of this FIG. 3 routine.

Thus, by the repeated loopy operation of the steps 17a and 17b as detailed above, a feedback control of the disengagement of the brake B0 of the auxiliary transmission mechanism 10 is performed, so as to ensure that the rotational speed Nt of the power input shaft 9 of the overall transmission mechanism 7 is kept substantially constant. Thus, shifting shock during the changing of the transmission is effectively prevented, which is particularly helpful for increasing transmission durability and reliability, as well as vehicle drivability and operational comfort.

Now, reverting to the decision step 22, to which, as specified earlier, the flow of control comes from the decision step 3 when it is decided that an upshift from the second to the third speed stage is not required at this time: in this step 22, a decision is made as to whether or not, at this time, a downshift from the third speed stage to the second speed stage of the overall gear transmission mechanism 7 is currently required, based upon the results of the calculations and the like made in the step 3. If the answer to this decision is YES, then next the flow of control passes to the decision step 23; and otherwise, if the answer to this decision is NO, the flow of control passes as indicated by the dashed line to a program portion not detailed herein because it is not directly relevant to the present invention.

In the decision step 23, to which the flow of control comes if definitely a downshift from the second speed stage to the third speed stage of the overall gear transmission mechanism 7 is currently required, a decision is made as to whether or not the elapsed time Tr (determined by a timer or the like) since first the decision for this downshift was made has become greater than or equal to the determinate time interval T1, or not. If the answer is NO, then this downshift delay time interval T1 has not yet been concluded, and accordingly the flow of control passes next to the step 25, in which the value of the flag F1 is set to 3, so as to bypass the steps 2, 3, 4, and 22 on the next iteration through the FIG. 3 routine; and then the flow of control passes to the end of said FIG. 3 routine, to cycle again back to this decision step 23 in a tight loop, until in fact the elapsed time Tr does become equal to the determinate time interval T1. On the other hand, if the answer to the step 23 decision is YES, so that enough time has elapsed since the downshift decision, then next the flow of control passes to the step 24.

Figure 5:
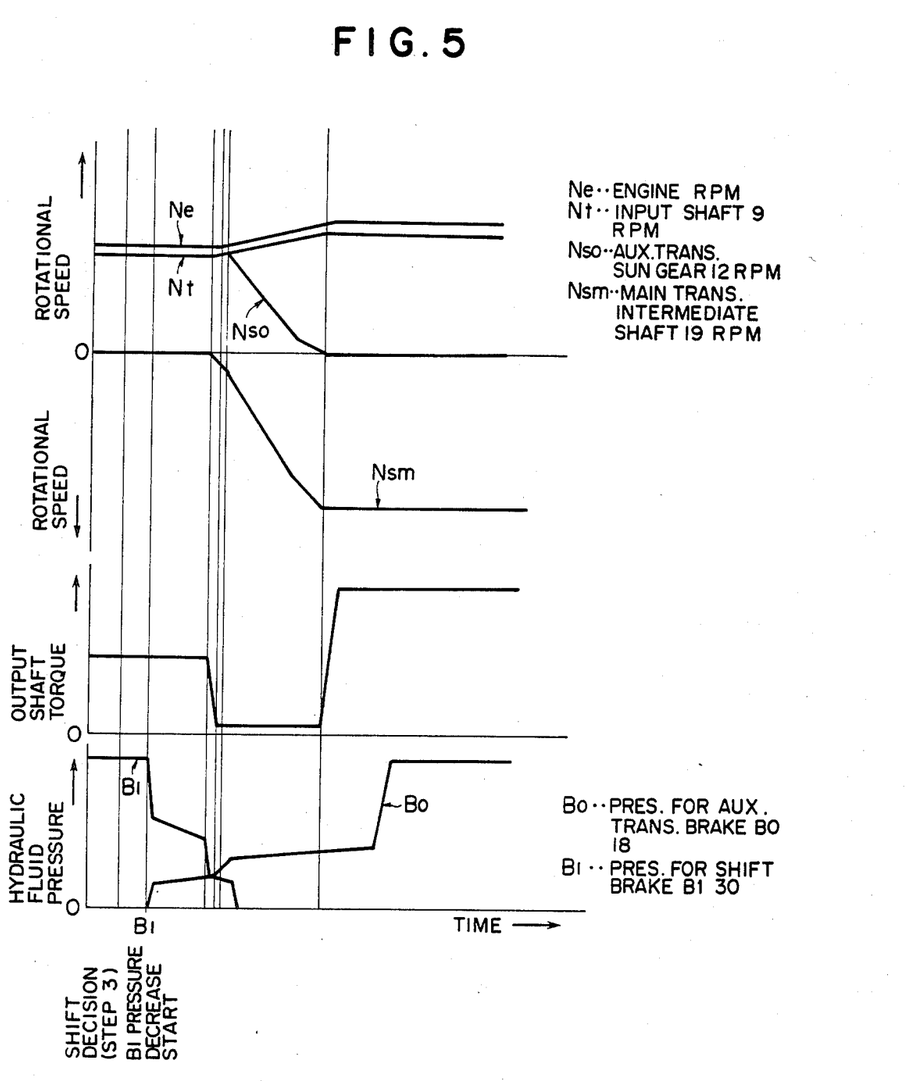
FIG. 5 is a set of time charts relating to a downshift of the FIG. 1 transmission under the control of the FIG. 3 program fragment, showing downshifting operational characteristics.

In the step 24, the value of the flag F1 is set back to zero again, and the flow of control passes to the step 26. In this step 26, action is taken to start decreasing the actuating pressure to the brake B1 of the main gear transmission mechanism 11, and also action is taken to start increasing the actuating pressure to the brake B0 of the auxiliary gear transmission mechanism 10 by a certain amount, only. Thus, the shift brake B1 of the main gear transmission mechanism 11 is released, and the brake B0 of the auxiliary gear transmission mechanism 10 is brought to its position before it exerts braking effect. Also, the value of the flag F2 is set to be equal to 3, so as to bypass the steps 3, 4, 22, 23, 24, and 26 on the next iteration through the FIG. 3 routine; and then the flow of control passes to the step 27. The time point in the FIG. 5 operational characteristic chart corresponding to this action point for starting the decrease of the actuating pressure for the brake B1 is shown by the second vertical line. And, as shown in FIG. 5 after said second vertical line, henceforward the actuating pressure of the brake B1 decreases, at first relatively suddenly due to the initial pressure gush out, and thereafter more slowly for a certain time period, after which it decreases more rapidly again when the engagement of said brake B1 has been released. Meanwhile, at this time, the rotational speeds of the various relevant transmission members do not substantially alter.

In the next step 27, as in the step 9, the value $Nt_i$ of Nt, the rotational speed of the input shaft 9 of the overall gear transmission mechanism 7 as sensed by the rotational speed sensor 65 therefor, acquired on the last time through this FIG. 3 routine, is assigned to the storage location $Nt_{i-1}$, and then the current value of NT is inputted from the sensor 65 and is assigned to the storage location $Nt_i$. Thus, after this step 27, the previous value of Nt is contained in the location $Nt_{i-1}$, and the current value of Nt is contained in the location $Nt_i$.

Next, in the decision step 28, a test is made as to whether or not $Nt_i$ is greater than $Nt_{i-1}$, or not, in other words, as to whether the rotational speed Nt of the transmission input shaft 9 is rising, or not. If the answer is NO, then the value of a count C is set to zero in the step 30, and the flow of control passes to exit from the FIG. 3 routine, without doing anything further, but if the answer is YES, so that now the rotational speed Nt of the transmission input shaft 9 is rising, then the flow of control passes next to the step 29.

In the step 29, the value of the count C is incremented, and then control passes to the decision step 31. In this decision step 31, a decision is made as to whether the counted value in the count C has yet become greater than or equal to the determinate value Cset, or not. If the answer is NO, so that a certain determinate time has not yet passed, then the flow of control passes to exit from the FIG. 3 routine, without doing anything further, but if the answer is YES, so that the rotational speed of the input shaft 9 has been rising for at least a determinate time period corresponding to this determinate count value Cset, then this is taken as the starting point of the inertia phase, and the flow of control passes next to the step 32.

In this step 32, the increasing of the actuating pressure for the brake B0 18 of the auxiliary gear transmission mechanism 10 is performed at a further increased rate, so that the upshifting of said auxiliary gear transmission mechanism 10 from its directly connected speed stage to its speed increasing speed stage is prosecuted at a higher rate than before. This rate is set in advance so that the increase rate of the rotational speed of the power input shaft 9 of the overall transmission 7 is maintained at a relatively constant determinate value. Thus, the engagement of the brake B0 18 is effectively started, and the rotational speed of the power input shaft 9 and of the crankshaft 101 of the engine 100 increase at this rate. Also the value of the flag F2 is set to be equal to 4, so as to bypass the relevant ones of the steps 3 through 31 on the next iteration through the FIG. 3 routine; and then next the flow of control passes to the step 33.

In this decision step 33, a test is made as to whether the time Tc elapsed since C became greater than or equal to Cset is greater than a determinate value T2, or not. If the answer is NO, then the flow of control passes to exit from the FIG. 3 routine, without doing anything further, but if the answer is YES, so that the rotational speed of the input shaft 9 has been rising for at least said determinate time period T2, which is set to correspond to the inertia phase in this third speed stage to second speed stage downshift, then it is taken that the inertia phase is ended, and the flow of control passes next to the step 34.

In this step 34, at which definitely the inertia phase of the third speed to second speed downshift of the gear transmission mechanism 7 has ended, then the actuating pressure being supplied to said brake B0 18 is abruptly increased to a full value, so as to fully engage the brake B0 18 as quickly as possible, so that said upshift of said auxiliary gear transmission mechanism 10 is finished as quickly as possible. And next the flow of control passes out of this FIG. 3 routine.

Figure 6:
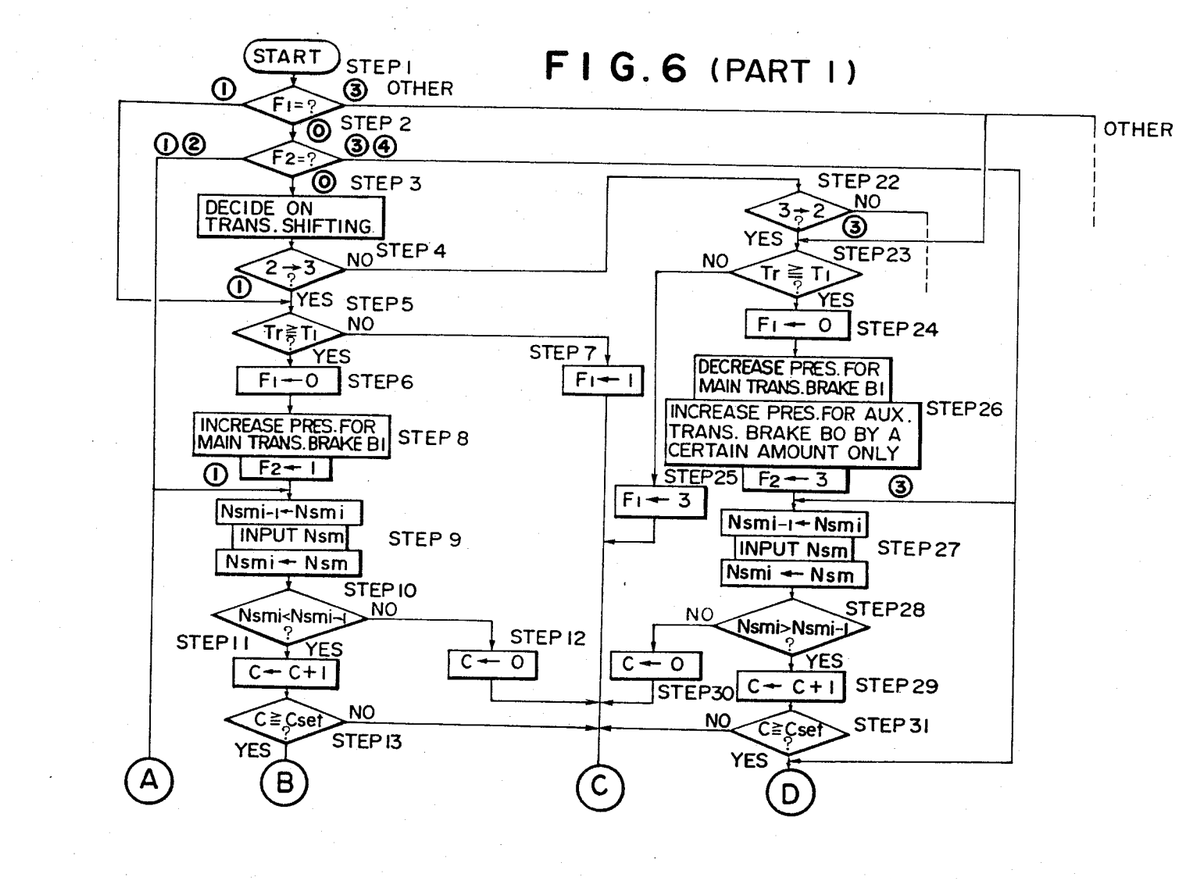
FIG. 6 is similar to FIG. 3, being a flow chart for a portion of a program executed by a microprocessor incorporated in said second preferred embodiment of the control system of the present invention, said portion relating to the second preferred embodiment of the method of the present invention.

In the above described action, the feedback control of the brake 18 (and of the associated clutch 17, mutatis mutandis) was performed according to the rotational speed of the power input shaft 9 of the overall gear transmission mechanism, which is also the rotational speed of the output member of the torque converter 2, i.e. of the turbine member 4, but in alternative embodiments of the method and the device of the present invention this feedback control could be performed according to the rotational speed of the engine 100, or alternatively according to the rotational speed of some other member of the transmission, for example a sun gear in the main gear transmission mechanism 11 or in the auxiliary gear transmission mechanism 10. In such a case, it is required to find the rotational speed characteristics of such a member for a constant or a fixed rate of change. In FIG. 6, in a fashion similar to FIG. 3, there is presented a flow chart showing the relevant parts of another possible program for the microcomputer 60, in second preferred embodiments of the device and the method of the present invention. In the following explanation of this FIG. 6, steps which are similar to steps relating to the first preferred embodiment detailed with regard to FIG. 3 will not be particularly described, and only the variant steps will be explained, from the point of view of conciseness of description.

In the FIG. 6 program, in the steps 9 and 27, it is the rotational speed Nsm of the intermediate shaft 19 of the main gear transmission mechanism 11 and of the sun gears 20 and 21 formed integrally therewith which is taken, rather than the rotational speed Nt of the power input shaft 9 as was the case in the first preferred embodiment detailed above; and naturally a sensor of some type must be provided for sensing this rotational speed Nsm, but this sensor is not particularly shown in any figure. Corresponding to this, in the steps 10 and 28 it is this rotational speed Nsm which is tested, rather than the rotational speed Nt as was previously tested. Further, in the step 15, a control target value Ksm is determined according to the predetermined rotational characteristics of said intermediate shaft 19 and of said integrally formed sun gears 20 and 21, and it is Nsm which is input. In the next step 16a, a test is made as to whether Nsm is greater than the value Ksm, or not. If it is, then the step 17a is proceeded to; but, if it is not, then a test is made as to whether Nsm is less than the value Ksm, or not. If it is, then the step 17b is proceeded to, but if it is not (so the condition of equality is holding), then the flow of control proceeds to the step 18. Also, in the step 19, the end of the inertia phase is detected by whether Nsm, the rotational speed of said integrally formed sun gears 20 and 21, is less than a determinate value Nset, or not. If it is less than said value Nset, then it is concluded that the inertia phase has concluded, and in the step 20 the brake B0 18 is abruptly released. Apart from these details, the operation of the FIG. 6 program is quite the same as that of the FIG. 3 program.

Although the present invention has been described in terms of the preferred embodiments thereof detailed above, and with reference to the illustrative drawings, it should not be considered as limited thereby, since various alterations, omissions, and/or modifications to the details of the shown preferred embodiments could be made further without departing from the scope of the present invention. Further, the details of the appended drawings are only to be taken as being exemplary, and not as being limiting, since in other possible embodiments these details could be departed from without straying from the scope of the present invention. Accordingly the scope of the present invention, and of the protection sought to be granted by Letters Patent, should be considered as defined, not by the perhaps purely fortuitous details of the shown preferred embodiments, or of the drawings, but solely by the legitimate and proper scope of the claims, which follow after the Table.

TABLE

|  | C1 (28) | C2 (29) | C0 (17) | B1 (30) | B2 (31) | B0 (18) | F1 (32) | F0 (16) |
| --- | --- | --- | --- | --- | --- | --- | --- | --- |
| P RANGE | X | X | O | X | X | X | F | F |
| R RANGE | X | O | O | X | O | X | F | O |
| N RANGE | X | X | O | X | X | X | F | F |
| D RANGE | | | | | | | | |
| 1ST | O | X | O | X | X | X | O | O |
| 2ND | O | X | X | X | X | O | O | F |
| 3RD | O | X | O | O | X | X | F | O |
| 4TH | O | O | O | X | X | X | F | O |
| 5TH | O | O | X | X | X | O | F | F |
| S RANGE | | | | | | | | |
| 1ST | O | X | O | X | X | X | O | O |
| 2ND | O | X | X | X | O | O | O | F |
| 3RD | O | X | O | O | X | X | F | O |
| L RANGE | | | | | | | | |
| 1ST | O | X | O | X | O | X | O | O |
| 2ND | O | X | X | X | O | O | O | F |

What is claimed is:

1. In an automatic transmission system for a vehicle, said automatic transmission system comprising a gear transmission mechanism which comprises a rotational element, and first and second friction engaging means which are oppositely changed over between engaged and disengaged states so as to alternately provide one of a first speed stage and a second speed stage of said gear transmission mechanism, a control system comprising:

first means for detecting a rotational speed of said rotational element;

second means for controlling an engagement and disengagement of said first friction engaging means so as to increase a degree of engagement of said first friction engaging means when activated in one of first and second actuating directions thereof and to decrease the degree of engagement of said first friction engaging means when activated in the other of said first and second actuating directions;

third means for repetitively comparing each current value of the rotational speed of said rotational element detected by said first means with a preceding value of the rotational speed of said rotational element detected by said first means in said repetitive comparison;

fourth means for activating said second means to incrementally activate said second means in one of said first and second actuating directions each time said third means detects in said repetitive comparison that the rotational speed of said rotational element is changing in a consistent direction and to incrementally activate said second means in the other of said first and second actuating directions each time said third means detects in said repetitive comparison a change in the direction of change of said rotational speed of said rotational element from said consistent direction until the rotational speed of said rotational element reaches a predetermined value, and to rapidly activate said second means in said consistent direction when the rotational speed of said rotational element reaches said predetermined value.

2. A control system according to claim 1, wherein said rotational element is a power input member of said gear transmission mechanism.

3. A control system according to claim 1, wherein said first friction engaging means is a brake which is engaged in a second speed stage and is disengaged in a third speed stage of said automatic transmission system, while said second friction engaging means is a brake which is disengaged in said second speed stage and is engaged in said third speed stage of said automatic transmission system, and said fourth means comprises means for activating said second means in an actuating direction into incrementally decrease the degree of engagement of said first friction engaging means each time said third means detects in said repetitive comparison that the rotational speed of said rotational element is decreasing in a consistent direction and activating said second means in an actuating direction to incrementally increase the degree of engagement of said first friction engaging means each time said third means detects in said repetitive comparison that the direction of change of the rotational speed of said rotational element has changed from said consistently decreasing direction.

4. A control system according to claim 3, wherein said fourth control means includes means for starting to incrementally activate said second means after said second friction engaging means has started to engage.

5. In an automatic transmission system for a vehicle, said automatic transmission system comprising a gear transmission mechanism which comprises a rotational element, and first and second friction engaging means, which are oppositely changed over between engaged and disengaged states so as to alternately provide one of a first speed stage and a second speed stage of said gear transmission mechanism, a control system comprising:

first means for detecting a rotational speed of said rotational element;

second means for controlling an engagement and disengagement of said first friction engaging means so as to increase a degree of engagement of said first friction engaging means when activated in one of first and second actuating directions thereof and to decrease the degree of engagement of said first friction engaging means when activated in the other of said first and second actuating directions;

third means for repetitively comparing each current value of the rotational speed of said rotational element detected by said first means with a guide value which is preliminarily scheduled to vary according to a lapse of time; and fourth means for activating said second means to incrementally activate said second means in one of said first and second actuating directions each time said third means detects in said repetitive comparison that the current rotational speed of said rotational element in smaller than the current value of said preliminarily scheduled guide value but to incrementally activate said second means in the other of said first and second actuating directions each time said third means detects in said repetitive comparison that the current rotational speed of said rotational element is larger than the current value of said preliminarily scheduled guide value, until the rotational speed of said rotational element reaches a predetermined value and to rapidly activate said second means in said one direction when the rotational speed of said rotational element reaches said predetermined value.

6. A control system according to claim 5, wherein said rotational element is a sun gear of said automatic transmission system, said sun gear being left to rotate in said first speed stage and braked in a standstill state in said second speed stage.

7. A control system according to claim 5, wherein said first friction engaging means is a brake which is engaged in a second speed stage and is disengaged in a third speed stage of said automatic transmission system, while said second friction engaging means is a brake which is disengaged in said second speed stage and is engaged in said third speed stage of said automatic transmission system, and said fourth means comprises means for activating said second means in an actuating direction to incrementally decrease the degree of engagement of said first friction engaging means each time said third means detects in said repetitive comparison that the current rotational speed of said rotational element is smaller than the current value of said preliminarily scheduled guide value but activates said second means in an actuating direction to incrementally increase the degree of engagement of said first friction engaging means each time said third means detects in said repetitive comparison that the current rotational speed of said rotational element is larger than the current value of said preliminarily scheduled guide value.

8. A control system according to claim 7, wherein said fourth control means includes means for starting to incrementally activate said second means after said second friction engaging means has started to engage.

* * * * *